(12) United States Patent
Derscheid

(10) Patent No.: US 9,599,163 B2
(45) Date of Patent: Mar. 21, 2017

(54) EXTERNAL BEARING SEAL ARRANGEMENT

(71) Applicant: DEERE & COMPANY, Moline, IL (US)

(72) Inventor: Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 77 days.

(21) Appl. No.: 14/659,389

(22) Filed: Mar. 16, 2015

(65) Prior Publication Data

US 2016/0273588 A1   Sep. 22, 2016

(51) Int. Cl.
*F16C 33/76* (2006.01)
*F16C 33/78* (2006.01)
*F16C 23/08* (2006.01)

(52) U.S. Cl.
CPC ...... *F16C 33/7886* (2013.01); *F16C 33/7823* (2013.01); *F16C 33/7866* (2013.01); *F16C 23/084* (2013.01)

(58) Field of Classification Search
CPC ...... F16C 33/7886; F16C 33/72; F16C 33/76; F16C 33/78; F16C 33/7816; F16C 33/7823; F16C 33/7826; F16C 33/7889; F16C 33/7853; F16C 23/084; F16C 33/7866; F16J 15/3204; F16J 15/3232; F16J 15/3236; F16J 15/3456
See application file for complete search history.

(56) References Cited

U.S. PATENT DOCUMENTS

| | | | |
|---|---|---|---|
| 3,245,735 A | 4/1966 | Hans | |
| 3,640,540 A | 2/1972 | Larsson | |
| 4,355,992 A * | 10/1982 | Ladin | F16H 55/30 277/353 |
| 4,763,957 A * | 8/1988 | Poehlmann | B60B 27/023 301/110.5 |
| 5,017,024 A | 5/1991 | Clark et al. | |
| 6,854,893 B2 * | 2/2005 | Schmidt | F16C 13/006 384/477 |
| 7,011,452 B2 * | 3/2006 | Suzuki | F16C 33/783 277/411 |
| 7,481,756 B2 * | 1/2009 | Derscheid | A01F 15/18 29/891 |
| 8,333,515 B2 * | 12/2012 | Milliken | F16C 33/7806 384/477 |

(Continued)

FOREIGN PATENT DOCUMENTS

CN   202768791   3/2013
DE   4204065 A1   8/1993

(Continued)

OTHER PUBLICATIONS

European Search Report in foreign counterpart application 16156528.8 dated Aug. 10, 2016 (10 pages).

*Primary Examiner* — Adam D Rogers

(57) ABSTRACT

An external bearing seal may have an annular support disk concentric about an axis and an annular seal body. The annular seal body may be supported by the support disk one of radially inward and outward of the support disk with respect to the axis. The seal body may have a plurality of concentric seal rings extending at least partially in the axial direction.

14 Claims, 8 Drawing Sheets

(56) References Cited

U.S. PATENT DOCUMENTS

| | | | | |
|---|---|---|---|---|
| 8,646,985 B2* | 2/2014 | Docimo | ................ | F16C 19/38 |
| | | | | 384/480 |
| 8,702,312 B2* | 4/2014 | Yamada | ................ | B65G 39/09 |
| | | | | 277/353 |
| 8,905,879 B2* | 12/2014 | Lannutti | ............... | F16C 13/006 |
| | | | | 384/481 |
| 2007/0286542 A1* | 12/2007 | Bober | ................. | F16C 33/7813 |
| | | | | 384/485 |
| 2008/0124015 A1* | 5/2008 | Fujiwara | ............... | B65G 39/09 |
| | | | | 384/484 |
| 2010/0247014 A1* | 9/2010 | Ohmori | ................ | F16C 19/186 |
| | | | | 384/486 |
| 2016/0003302 A1* | 1/2016 | Seno | ................... | F16J 15/3264 |
| | | | | 277/351 |

FOREIGN PATENT DOCUMENTS

| | | | |
|---|---|---|---|
| FR | 2231885 A1 | 12/1974 | |
| GB | 2437273 | 9/2009 | |
| JP | 2000120711 A | 4/2000 | |
| WO | 2006099014 A1 | 9/2006 | |
| WO | 2011121385 A1 | 10/2011 | |
| WO | 2012063506 A1 | 5/2012 | |
| WO | 2014190377 A | 10/2014 | |

* cited by examiner

EXTERNAL BEARING SEAL ARRANGEMENT

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates generally to seals for bearings, including external seal arrangements for bearings.

BACKGROUND OF THE DISCLOSURE

Bearings come in a variety of configurations. For example, bearings typically have an inner race, an outer race, and rollers disposed between the inner race and outer race. The rollers may, for example, be ball bearings, cylindrical rollers, or tapered rollers. The rollers may be separated by a cage to maintain constant spacing between the rollers. To increase the life of the bearing, the bearing may be lubricated with a fluid, such as oil or grease. Bearings may be open (i.e., unsealed) or may be sealed. An open bearing may need to be supplied with additional lubrication over time, whereas a sealed bearing may be provided with lubrication that will last for the life of the bearing in the absence of leakage of the lubrication.

Sealed bearings may have an internal or external seal to prevent debris from entering the bearing and to prevent lubricating fluid from leaking out of the bearing. Debris, such as dirt, crop residue, and/or moisture, in the bearings can cause loss of lubrication, corrosion to the rollers and/or the races, and additional wear through abrasion. Loss of lubrication can similarly result in increased wear, such as through increased friction between the rollers and the inner and outer races. Internal bearing seals may be crimped or pressed onto the outer and/or inner races of the bearing to create a single seal or shield extending radially between the inner and outer races. An external seal, such as a lip or ring seal made of elastomeric material, such as rubber, may protect a particular area of the bearing by creating a seal pressing against a portion of the bearing. If these seals are insufficient to prevent containments from entering the bearing or leakage of lubricating fluid, additional seals to ensure adequate sealing, or to provide backup sealing, may be problematic, in that more axial space is taken up by the bearing and seal compared to the bearing alone or the bearing with a simple seal.

SUMMARY OF THE DISCLOSURE

An external seal bearing arrangement is disclosed, such as for providing sealing to a bearing mounted in an agricultural machine (e.g., a baler) to prevent lubricating grease from leaking out of the bearing and for preventing contaminants from entering the bearing.

According to one aspect, the disclosure provides an external bearing seal. The bearing may include an annular support disk, concentric about an axis, and an annular seal body. The annular seal body may be supported by the support disk radially inward or outward of the support disk with respect to the axis. The seal body may have a plurality of concentric seal rings extending at least partially in the axial direction.

According to another aspect of the disclosure, a bearing assembly may include a bearing and an external seal arrangement. The bearing may have an inner race and an outer race concentrically arranged and spaced apart by one or more bearing members about which the inner and outer races are relatively rotatable about an axis. The external seal arrangement may have one external seal arranged axially outside of the bearing. The external seal may have at least one seal ring in sealing engagement with at least one of the inner and outer races of the bearing.

Another aspect of the disclosure provides a bearing assembly for coupling a shaft extending along an axis in which the bearing assembly may include a bearing housing, a bearing, an external seal arrangement, and a locating feature. The bearing may be mounted in the bearing housing and may have inner and outer races concentrically arranged and spaced apart by one or more bearing members about which the inner and outer races are relatively rotatable about the axis. The external seal arrangement may have at least one external seal with at least one seal ring in sealing engagement with at least one of the inner and outer races of the bearing. The locating feature may set or fix the position of the external seal with respect to the bearing.

These and other features and advantages of the present disclosure will become clear to a person skilled in the art after reading the following detailed description and in consideration of the drawings.

BRIEF DESCRIPTION OF THE DRAWINGS

Like reference numerals in the drawings indicate like components, parts, or operations.

DETAILED DESCRIPTION

Figure 1:
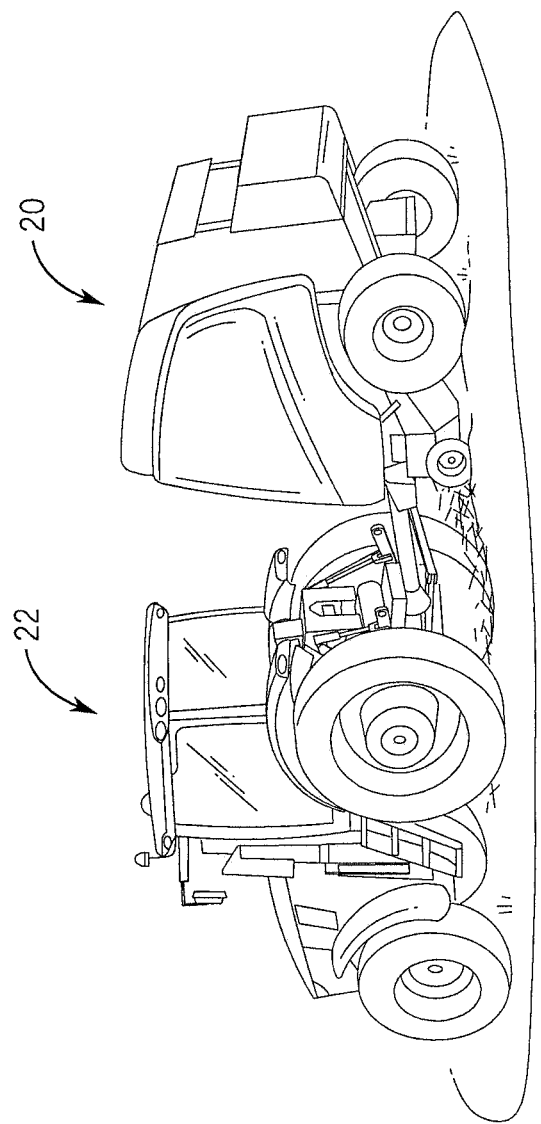
FIG. 1 is a perspective view of an example agricultural vehicle pulling an agricultural baler.
Figure 2:
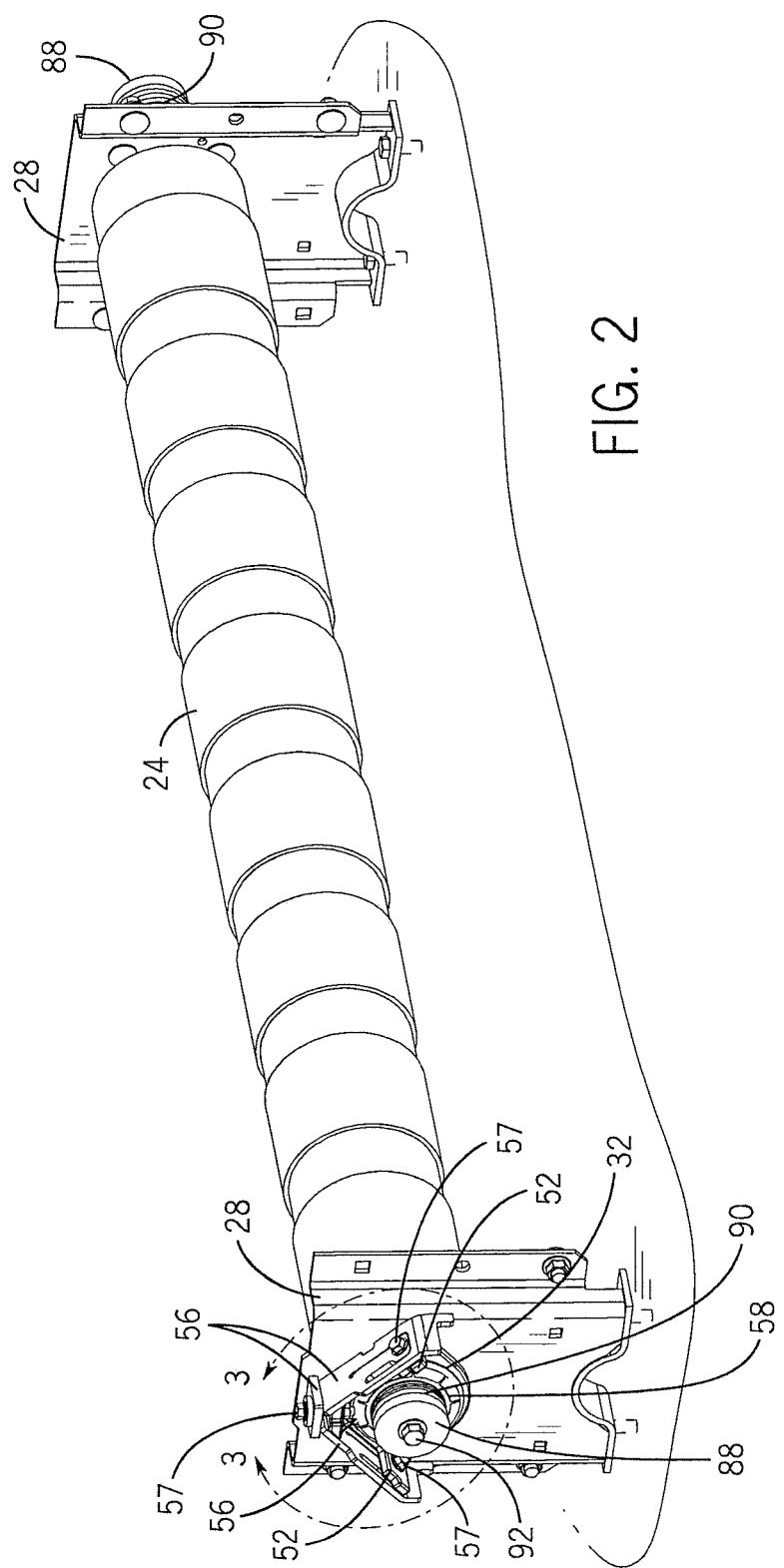
FIG. 2 is a perspective view of a roller rotatably coupled by a pair of bearings to a pair of roller supports for installation in the baler of FIG. 1.
Figure 4:
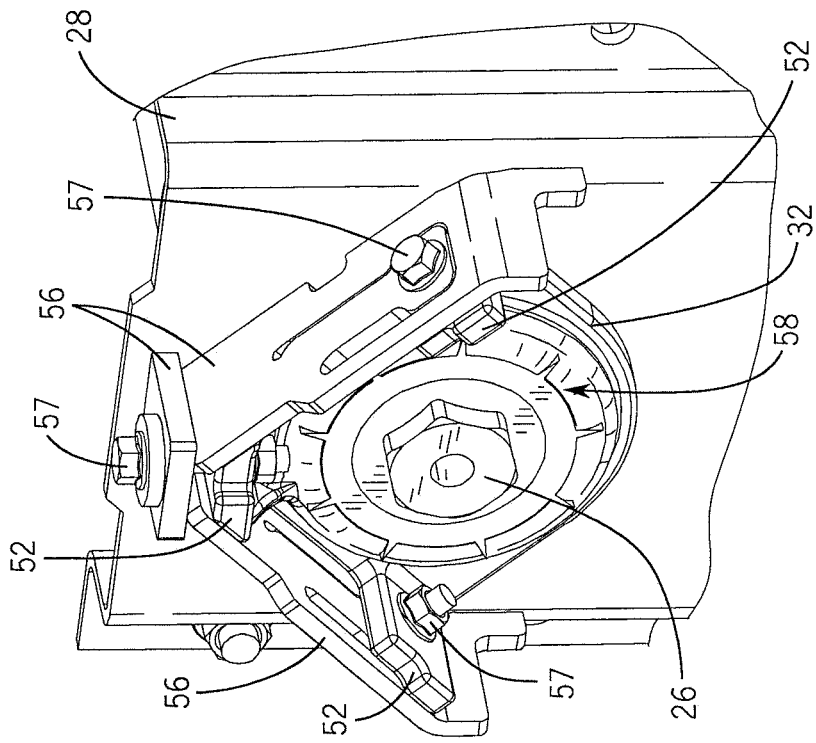
FIG. 4 is an enlarged partial perspective view showing the bearing of FIG. 3, without the clamping arrangement, and a keyed shaft for coupling the roller to the bearing.

The following describes one or more example embodiments of the disclosed bearing with an external bearing seal, as shown in the accompanying figures of the drawings described briefly above. Various modifications to the example embodiments may be contemplated by one of skill in the art.

At the onset, it is noted that use of terms of orientation herein is for the purpose of convenience and clarity with respect to conventionally understood orientations of rotating bearings and shafts. For example, the term "radial" is generally determined according to the axis of rotation of the bearing (shown in FIG. 6), and the external bearing seal, with the radial direction extending perpendicularly away from the axis. The axis may generally extend through the radial center of the bearing or external bearing seal. For "inner radial" and "outer radial," the inner radial is generally radially closer to the axis, while the outer radial is generally farther from the axis. The "axial direction" is generally determined as the direction that extends in the same direction as the axis and is perpendicular to the radial directions. The terms "inner axial" direction may refer to a direction that is extending toward the bearing when the system is assembled, while the "outer axial" direction may refer to a direction that extends away from the bearing when the system is assembled.

In certain applications bearings are subjected to high amounts of contaminants external to the bearing, which if allowed to enter the bearing will result in decreased life and performance of the bearing. As noted above, it may be beneficial to provide an external seal to assist in preventing contaminants from entering the bearing and lubricating fluid from leaking out of the bearing. The external seal may be provided to at least partially seal an otherwise unsealed bearing, or may be utilized to provide additional sealing to an internally sealed bearing. For example, a first external seal may be provided on one side of the bearing, or alternatively, a first and second external seals may be provided on opposite sides of the bearing to seal both sides of the bearing. The external seal may have one or more sealing rings to provide redundant sealing at a variety of locations along the bearing and/or a housing for mounting the bearing.

In certain embodiments, an external seal may include a mounting disk and a sealing body disposed radially outward from the mounting disk. The sealing body may be attached to the mounting disk in a variety of ways, such as through a notch and groove or through crimping.

The external bearing seal may be mounted to the bearing and/or bearing housing in a variety of ways. For example, the external bearing seal may clamped to the bearing using a clamping plate, may be crimped to one of the inner race or outer race of the bearing, may be shimmed onto a shaft coupled to the bearing, or may be retained on the shaft using a snap ring or other type of fastener. In an installed state, each bearing and housing may have a pair of external bearing seal assemblies, with one external bearing seal located on each axial end of the bearing and housing to provide sealing to both axial ends of the bearing and housing or a shaft coupled to the inner race.

The external bearing seal may rotate relative to the inner race or outer race, or alternatively may rotate relative to both the inner race and outer race. The external bearing seal may also be rotationally fixed to one of the inner race or outer race. For example, the external bearing seal may be fixed rotationally relative to the inner race and may rotate relative to the outer race, or may be fixed rotationally relative to the outer race and may rotate relative to the inner race. During operation of the rollers, a portion of the external bearing seal, for example the sealing rings, may press or seal against a portion of the bearing and/or at a location external to the bearing. The sealing rings at these sealing locations may touch or press against the bearing and/or the location external to the bearing while still rotating relative to that surface. Sufficient clamping force may be provided to ensure sufficient sealing by the external bearing seal while allowing the sealing surfaces to rotate relative to one or both of the inner race and the outer race.

The disclosed external seal may be implemented with respect to a variety of rotating machinery, including various agricultural implements, which may be exposed to high levels of containments (e.g., crop debris). For example, referring now to FIG. 1, an agricultural machine or implement, such as a round baler 20, may be pulled behind an agricultural vehicle, such as a tractor 22. The baler 20 may be used to compress a cut and racked crop (e.g., straw, silage, hay) into compact bales for easy handling, transport, and storage. The baler 20 may have one or more rollers 24, each having a shaft 26, and may be attached to the baler 20 through a pair of roller supports 28, as shown in FIGS. 2-6. The shaft 26 may be keyed toward both axial ends (e.g., hexagonal). The roller 24 may be rotatably coupled to the roller supports 28 through a pair of bearings 30 each mounted inside a respective bearing housing 32.

Figure 6:
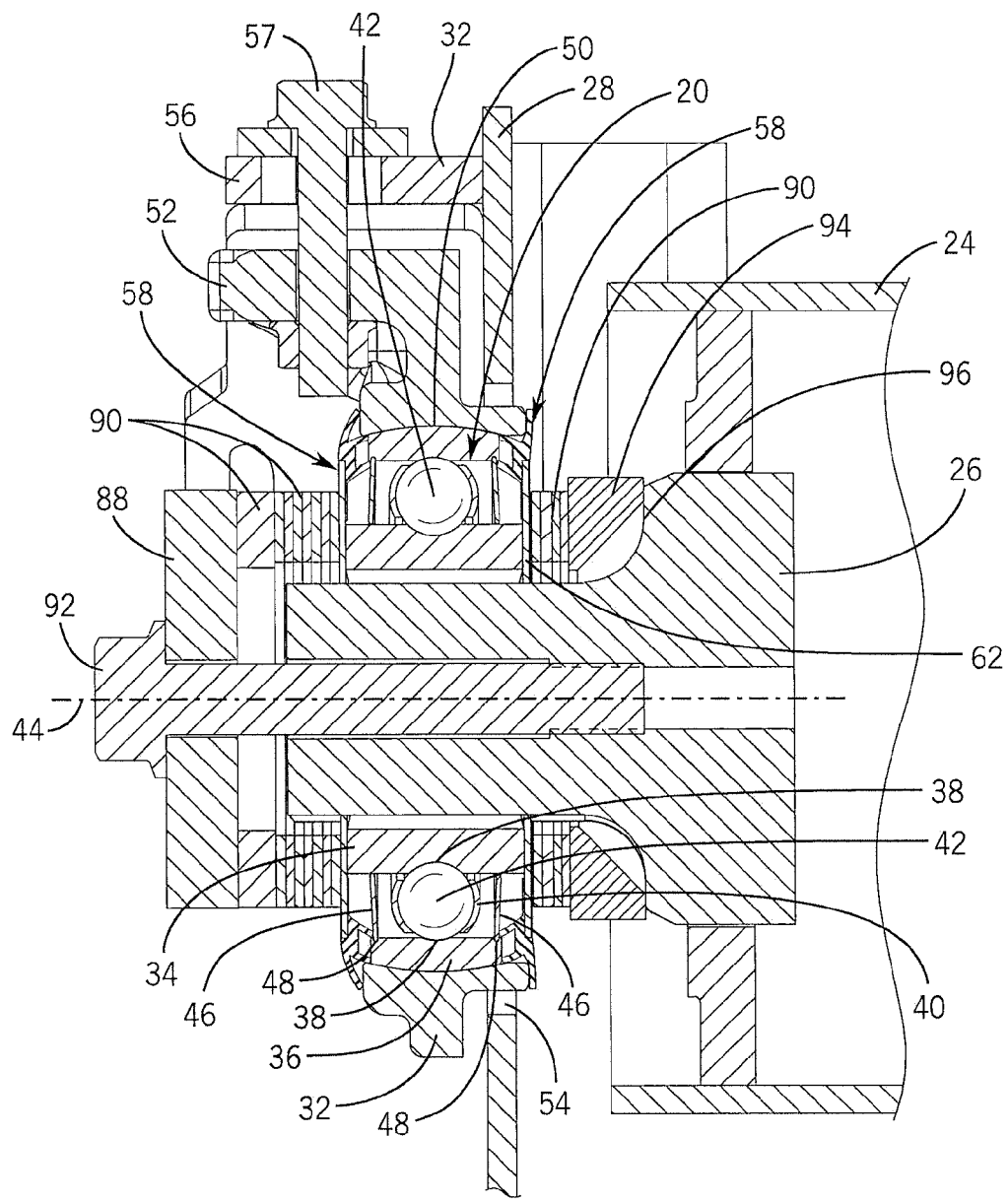
FIG. 6 is a side cross-sectional view along line 6-6 of FIG. 5.
Figure 7:
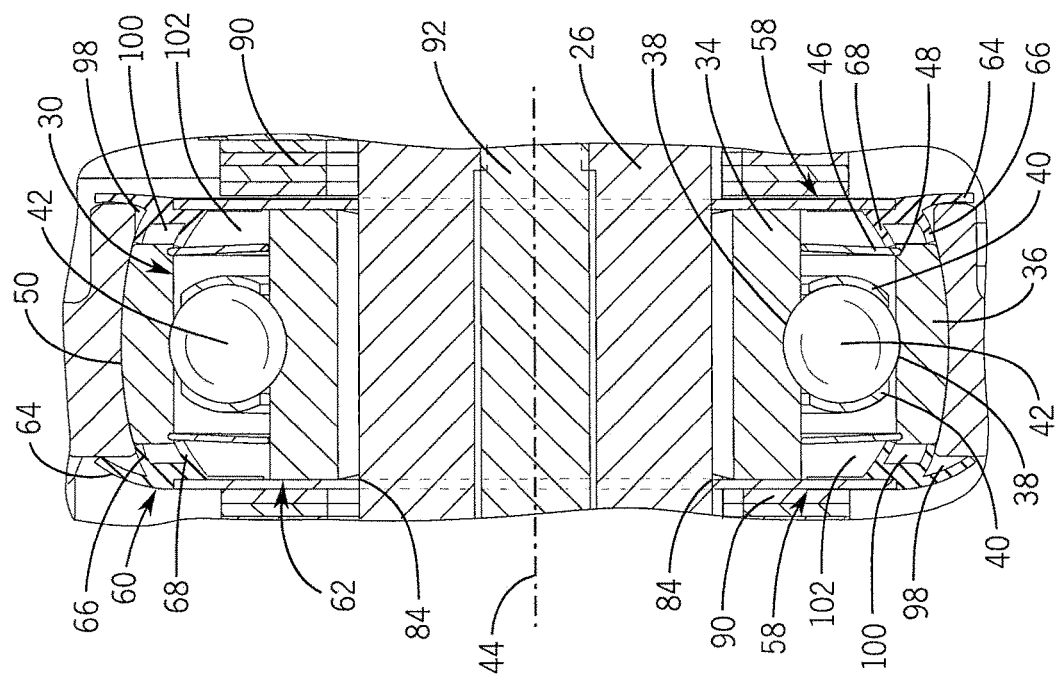
FIG. 7 is an enlarged partial side cross-sectional view of FIG. 6.
Figure 8:
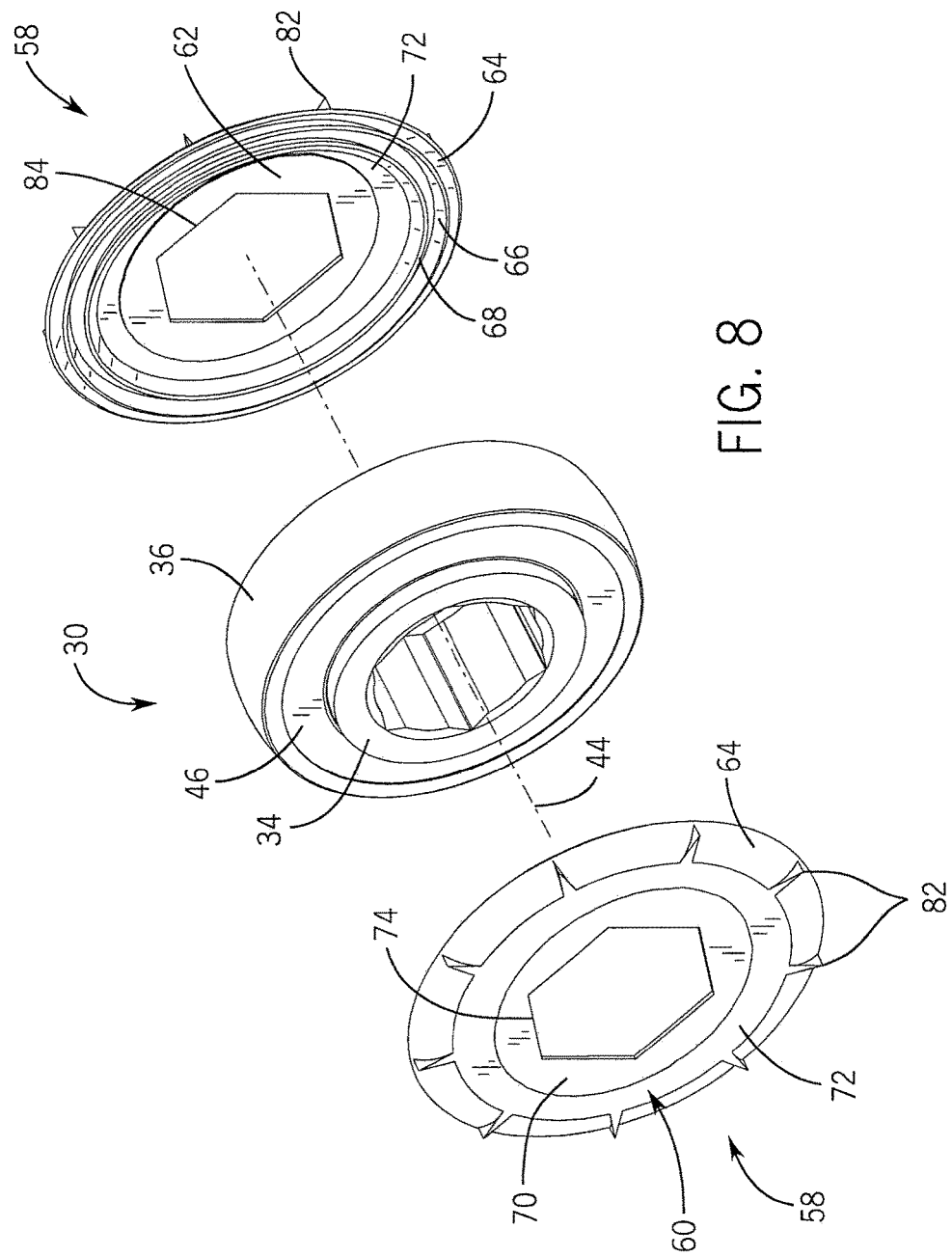
FIG. 8 is an exploded perspective view of the bearing and two external bearing seals of FIG. 2.

Referring also to FIGS. 6-8, each bearing 30 may have an inner race 34 and an outer race 36, which may be coaxial with one another. The inner 34 and outer 36 races each have inward facing surfaces facing one another. The inner 34 and outer 36 races may each have a shallow groove, or raceway 38, on their inward facing surface. A cage 40 may be disposed between the inner 34 and outer 36 races, with at least one bearing member 42 disposed within the cage 40 and seated in the raceway 38. The bearing member 42 may, for example, be a ball bearing, a cylinder roller, or a taper roller. The bearing member 42 allows the inner 34 and outer 36 races to rotate relative to one another about the axis 44, while the cage 40 allows a plurality of bearing members 42 to occupy the raceways 38, and to be kept at different angular distances from one another compared to the axis 44 of rotation of the bearing 30. The outer race 36 may additionally be curved on an outward facing surface, as shown in FIG. 6, to aid in mounting the bearing 30 to the housing 32, as described below.

A pair of annular inner seals or shrouds 46 are shown in FIGS. 6 and 8, and may be disposed between the inner race 34 and the outer race 36 of the bearing 30 to prevent lubricating fluid from leaking out of the bearing 30 and to prevent debris and other contaminates from entering the interior of the bearing 30. Each shroud 46 may fit within a pair of annular trenches 48 on the inward facing surface of one of the inner 34 and outer 36 races, or a pair on both the inner 34 and outer 36 races. In one example, as shown in FIG. 6, the annular trenches 48 may be located on the outer race 36. The trenches 48 may be located toward opposite axial ends of the races 34 and/or 36, such that when the shrouds 46 are installed, the bearing 30 is sealed toward both axial ends by the shrouds 46 and on the radial ends by the inner 34 and outer 36 races. The shrouds 46 may be installed by snap fitting the shrouds 46 into the trenches 48. The shrouds 46 may be rotationally fixed relative to one of the inner 34 and outer 36 races. For example, if only one of the inner 34 and outer 36 races has the trenches 48, then the shrouds 46 may be fixed relative to the trenched race 34 or 36 and may rotate relative to the non-trenched race 34 or 36. If both races 34 and 36 have trenches 48, then the shrouds may rotate relative to one or both of the races 34 and 36. The shrouds 46 may be made of a rigid material, such as steel.

It will be appreciated that the shrouds 46 may also be at least partially coated in, an elastomeric material to assist in sealing the bearing 30.

Referring now to FIGS. 3-6, the bearing housing 32 may couple the bearing 30 with the roller support 28. The bearing housing 32 may be at least as thick as the axial length of the outer race 36. The housing 32 may have an opening 50 for accepting the bearing 30. The opening 50 may have a curvature along its axial length, such that it has a larger diameter toward its axial center, and a smaller diameter toward the axial ends. This curvature may substantially match the curvature of the outer surface of the outer race 36 to help retain the bearing 30 within the housing 32 when installed. One or more mounting tabs 52, may extend from the bearing housing 32 for releasably attaching the bearing housing 32 to the roller support 28.

Figure 3:
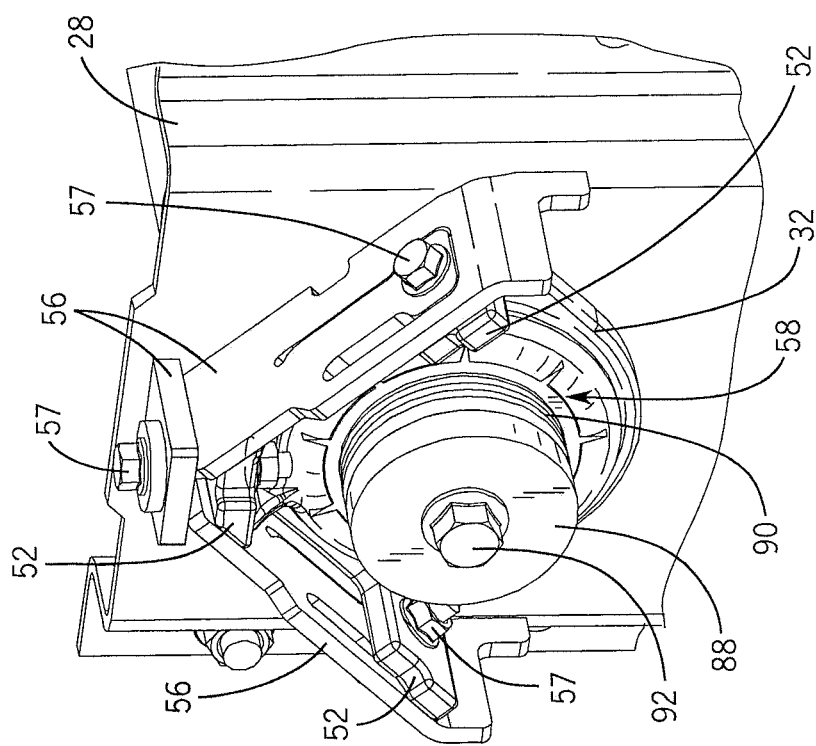
FIG. 3 is an enlarged partial perspective view of the area 3-3 of FIG. 2 showing one of the bearings installed onto roller supports with a clamping arrangement.
Figure 5:
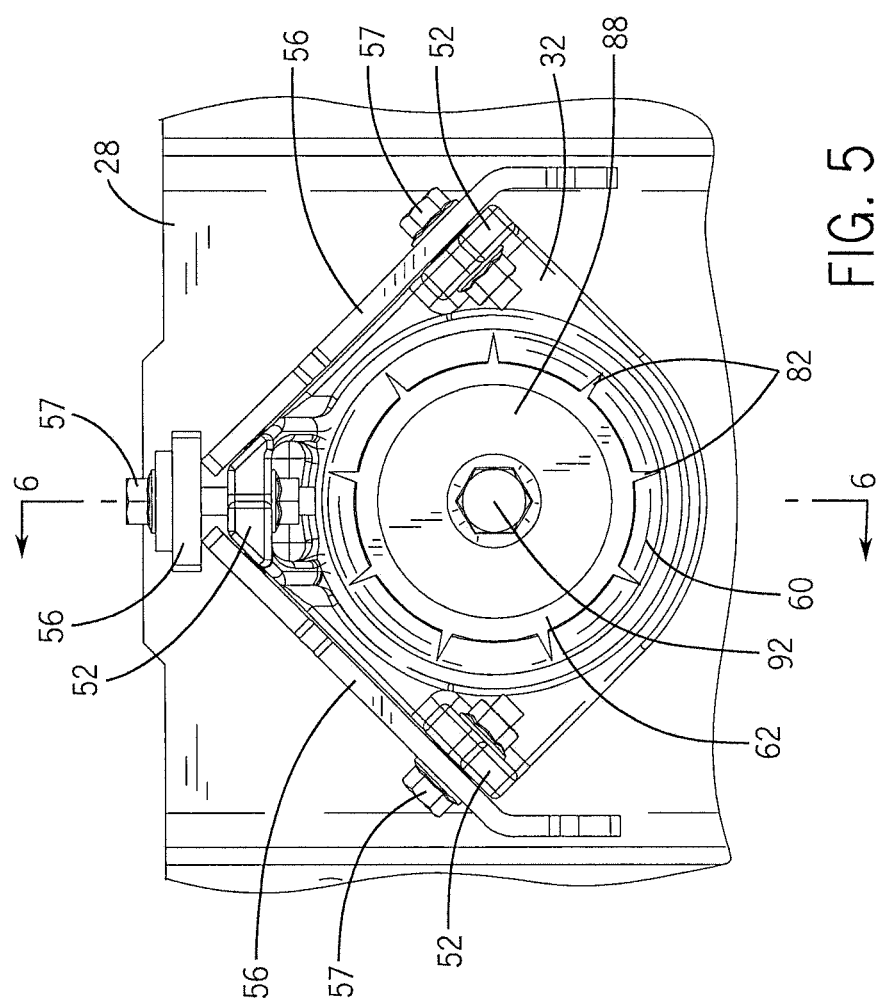
FIG. 5 is a front view thereof.

The pair of roller supports 28, as shown in FIGS. 3, 5, and 6, rotatably couples the roller 24 to the baler 20. Each roller support 28 has an opening 54 for accepting a portion of the bearing housing 32. The roller support 28 may have a plurality of mounting brackets 56, shown as three in FIG. 5, for securing the bearing housing 32 to the roller support 28. The mounting brackets 56 may be coupled to the mounting tabs 52, such as with threaded fasteners 57.

Referring also to FIGS. 8-11, each bearing 30 and housing 32 may have one external bearing seal 58, or may be provided with two external bearing seal 58 located on opposite axial sides of the bearing 30 and housing 32, as shown in FIGS. 6-8. The two external bearing seals 58 may be identical or similar in construction and will be described as one external bearing seal 58. The external bearing seal 58 may have an annular sealing member 60 supported on a support disk, or a mounting disk 62. The sealing member 60 may be an annular seal of flexible material, such as injection molded rubber, or any other suitable elastomer. The sealing member 60 may have a plurality (e.g., three) of annular sealing rings, or sealing lips. For example, the sealing member 60 may have first 64, second 66, and third 68 annular sealing rings and an annular mounting flange 70 extending from a seal body 72. The sealing rings 64, 66, and 68 and the mounting flange 70 may be spaced at different radial and/or axial locations along the seal body 72 and may extend at different angles from the seal body 72 to provide sealing at a variety of locations, for example, along the bearing 30 and/or bearing housing 32. The seal body 72 may be ringed shaped, having inner 74 and outer 76 radially spaced oblique surfaces and outer 78 and inner 80 axial surfaces. The inner surface 80 may be the portion of the external bearing seal 58 that is face towards the bearing 30 and the housing 32 while in an installed state. While the outer surface 78 may be the portion of the external bearing seal 58 that faces away from the bearing 30 and the housing 32 while in the installed state. The axial distance between the outer 78 and inner 80 axial surfaces may be adjusted to provide more or less rigidity by respectively making the seal body 72 thicker or thinner.

The first sealing ring 64 may extend from the outer radially spaced oblique surface 76 and outer axial surface 78, and may, for example, curve radially outward and axially inward from the seal body 72. A smooth transition between the seal body 72 and the first sealing ring 64 along the outer axial surface 78 may help to prevent debris accumulating around the external bearing seal 58 and/or housing 32. Additionally, a plurality of agitators 82 may extend outward from the outer axial surface 78, and/or the first sealing ring 64, and may extend in a radial direction along the outer axial surface 78 and/or the first sealing ring 64 to prevent accumulation of debris on or around the external bearing seal 58 and/or housing 32. As the external bearing seal 58 rotates, due to the shaft 26 rotating and/or the inner 34 or outer 36 races rotating, any debris abutting against the agitators 82 may be brushed or swept away from the external bearing seal 58 and/or housing 32.

The second 66 and third 68 sealing rings may extend obliquely, axially and inward, from the inner axial surface 80. The second 66 and third 68 sealing rings may be radially spaced from one another along the seal body 72. The degree of axial and radial extension of the second 66 and third 68 sealing rings, as well as the spacing between the second 66 and third 58 sealing rings, may be varied to provide redundant sealing along various locations of the bearing 30 and/or bearing housing 32 and may also be based at least partially on the flexibility of the sealing member 60 material.

The mounting flange 70 may extend in a substantially radial direction inward from the inner radially spaced oblique surface 74 of the seal body 72 and may, for example, have a forward facing surface flush with the outer axial surface 78 of the seal body 72. The mounting flange 70 may be relatively thin compared to the seal body 72, which may cause the mounting flange 70 to be more flexible to allow for easier coupling of the mounting flange 70 to the mounting disk 62.

Figure 11:
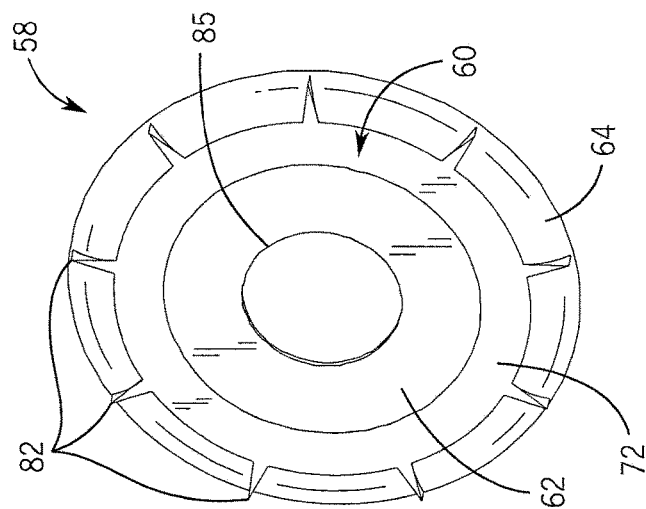
FIG. 11 is a perspective view of another example external bearing seal for the bearing of FIG. 2 having a non-keyed opening for the roller shaft.
Figure 10:
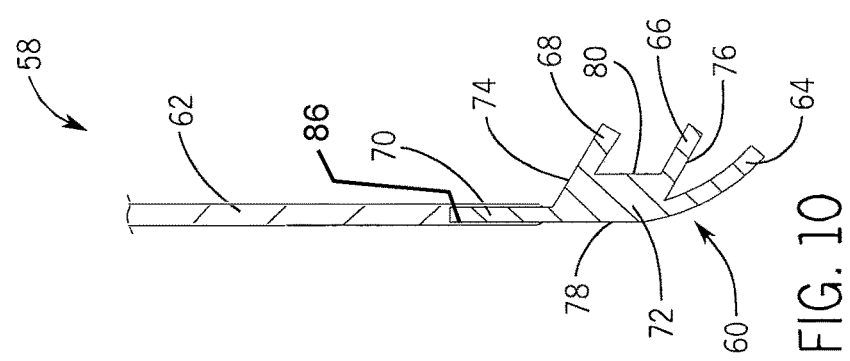
FIG. 10 is a partial side cross-sectional view taken along line 10-10 of FIG. 9.
Figure 9:
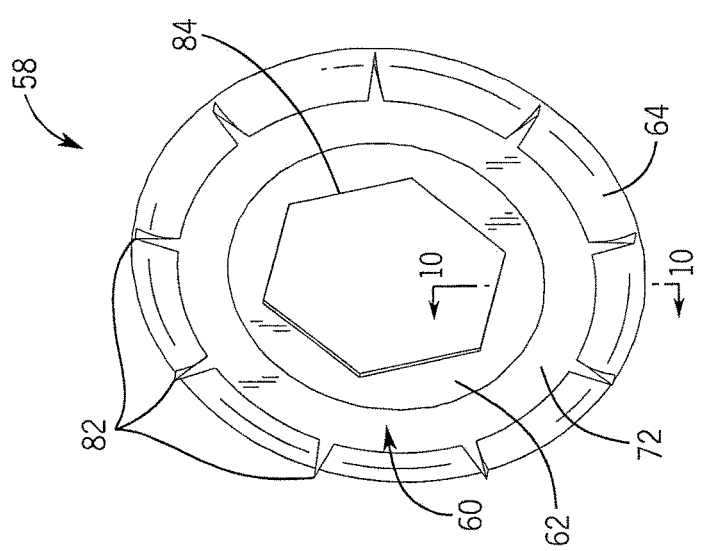
FIG. 9 is a perspective view of an external bearing seal for the bearing of FIG. 2 having a keyed opening for the roller shaft.

The seal mounting disk 62 may be made of a rigid material, such as steel. The mounting disk 62 may, for example, be in the shape of a relatively thin circular plate, as shown in FIG. 10. An opening 84 may extend axially through the radial center of the mounting disk 62 for accepting the shaft 26. The opening 84 may be keyed, such as the hexagonal shape shown in FIGS. 4 and 9, to match a similarly keyed shaft 26 and inner race of the bearing 30. It will be appreciated that the shaft 26 and the opening 84 may be keyed in any suitable shape or configuration to rotationally fix the external bearing seal 58 relative to the shaft 26. Alternatively, a circular opening 85 may be provided, as shown in FIG. 11, for accepting a shaft 27 having a similar shaped outer surface (i.e., circular) and inner race 35.

The mounting disk 62 may have an annular groove 86 extending along its outer circumference for mounting the sealing member 60 to the mounting disk 62. The groove 86 may extend radially inward from the outer circumference of the seal mounting disk 62, and may open at the circumference of the mounting disk 62 to accept the mounting flange 70. It will be appreciated, that the seal body 72 may be attached to the mounting disk 62 in any other suitable manner, such as by at least partially extending the sealing member 60 over the mounting disk 62, through an adhesive, and/or the sealing member 60 may be molded onto or over the mounting disk 62.

The two external bearing seals 58 may be sealed against opposite axial ends of the bearing 30 and/or bearing housing 32 and may be sealed against the shaft 26 and may rotationally and axially fixed relative to the shaft 26, such as through a clamping plate 88, shims 90, and a fastener 92. The clamping plate 88 and shims 90 may be used to exert a clamping force between the clamping plate 88 and the roller 24 on the pair of external bearing seals 58 to create a seal against the bearing 30 and housing 32. The amount of clamping force required may depend on the elasticity of the sealing member 60, the profile of the sealing rings 64, 66, and 68 and the desired sealing locations. Additional shims 90, may be stacked against one or both external bearing seals 58 to increase the clamping force against the external bearing seals 58. Similarly, fewer shims 90 may be used to provide less of a clamping force. It will be appreciated that each external bearing seals 58 may be associated with a different number of shims 90 to provide different clamping forces to the external bearing seals 58.

The assembly of the bearing 30, the housing 32, and the pair of external seals 58 to the roller 24 and roller support 28 will now be described. The bearing 30 may be coupled to the housing 32 by inserting the bearing 30 into the opening 50, and securing the bearing 30 through friction fit, at the curvatures of the outer race 36 and the opening 50. A collar 94 and shims 90 may be slid onto the shaft 26 until the collar 94 abuts against a shoulder 96 of the shaft 26 and the shims 90 abut against the collar 94. As noted, the number of shims 90 may be varied to achieve the desired clamping force on the external bearing seal 58 located between the shoulder 96 and the bearing 30 and housing 32. The inner external bearing seal 58 may be slid over the shaft 26, oriented with the sealing rings 64, 66, and 68 extending away from the shims 90, until the mounting disk 62 abuts against the shims 90. The shaft 26 may be slid through the inner race 34, which may be similarly keyed, until the mounting disk 62 abuts against the outer race 36.

The outer external bearing seal 58 may be slid over the shaft 26, oriented with the sealing rings 64, 66, and 68 extending towards the bearing 30 and housing 32, until the mounting disk 62 abuts against the outer race 36. The shims 90 may be slid onto the shaft 26 until the shims 90 abut against the mounting disk 62. Again, the number of shims 90 may be varied to achieve the desired clamping force for the outer external bearing seal 58. The clamping plate 88 may be slid onto the shaft 26 until the clamping plate 88 abuts against the shims 90. The fastener 92 may be secured to the shaft 26, such as by threading the fastener 92 into the shaft 26, to create a compressive force between clamping plate 88 and the shoulder 96. The compressive force causes the external bearing seals 58 to compress inward towards the bearing 30 and the housing 32 to seal against the bearing 30 and the housing 32. The amount of compressive force should be sufficient to provide a sufficient seal between the external bearing seal 58 and the surface being sealed against when the bearing 30 is rotating, since the external bearing seals 58 may be rotating relative to the outer race 36 and the housing 32. It will be appreciated that the roller 24 and the roller supports 28 may be coupled together prior to the installation of the roller 24 into the baler 20. Further, if a circular shaft 27 and a keyed mounting disk 62 are provided, more clamping force may be necessary since the inadequate clamping may cause rotation of the external bearing seals 58 relative to the shaft 27.

Referring now also to FIGS. 6 and 7, the external bearing seals 58 are shown in a compressed and sealed state (i.e., an installed state). The external bearing seal 58 may seal against the bearing 30 and the housing 32 in a variety of locations. For example, the mounting disk 62 may seat against the inner race 34, and may create a partial seal against the inner race 34. The first sealing ring 64 may seal against the housing 32. The second sealing ring 66 may seal against the housing 32, the outer race 36, and/or the interface between the housing 32 and the outer race 36. The third sealing ring 68 may seal against the outer race 36, the shroud 46, and/or the interface between the outer race 36 and the shroud 46. In this configuration, a first pocket 98 is formed between the first sealing ring 64, the second sealing ring 66, the seal body 72, the housing 32, and the inner race 34. A second pocket 100 is formed between the second sealing ring 66, the third sealing ring 68, the seal body 72, the bearing 30, and the shroud 46. A third pocket 102 is formed between the third sealing ring 68, the seal body 72, the mounting disk 62, the inner race 34, and the shroud 46.

By providing an external bearing seal 58 having a plurality of sealing rings 64, 66, and 68, the bearing 30 is substantially protected from lubricating fluid leaking out or debris entering the bearing 30 through a variety of redundant seals. For example, the first sealing ring 64 may provide a redundant seal to prevent debris from inadvertently entering the first pocket 98 from outside of the external bearing seal 58 and may prevent any lubricating fluid in the first pocket 98 from exiting the external bearing seal 58. The second sealing ring 66 may provide a redundant seal to prevent debris from inadvertently entering the second pocket 100 from the first pocket 98 or lubricating fluid from inadvertently entering the first pocket 98 from the second pocket 100. The third sealing ring 68 may provide a redundant seal to prevent debris from inadvertently entering the third pocket 102 from the second pocket 100 or lubricating fluid from entering the second pocket 100 from the third pocket 102 and/or the interior of the bearing 30. The mounting disk 62 and the shims 90 act as a redundant seal to prevent debris from entering the third pocket 102 from outside of the external bearing seal 58 and from lubricating fluid from exiting the external bearing seal 58.

In other words, the first 64, second 66, and third 68 sealing rings and the mounting disk 62 provide several layers of redundant seals, in addition to the shrouds 46, to prevent debris from outside of the external bearing seal 58 from inadvertently entering the bearing 30 and to prevent lubricating fluid inside the bearing 30 from inadvertently exiting the external bearing seal 58. This may increase the useful life of the bearing 30 and may ensure smoother operation of the rollers 24.

During operation of the rollers 24 in the baler 20, the rollers 24 and shaft 26 may rotate about the axis 44 through the bearings 30. Since the shaft 26 is attached to the inner race 34, the inner race 34 will rotate relative to the stationary outer race 36. Since the external bearing seal 58 is fixedly attached to the inner race 34, the external bearing seal 58 will rotate relative to the outer race 36 and the housing 32. During rotation of the rollers 24 and the inner race 34, the first 64, second 66, and third 68 sealing rings will rotate relative to their respective sealing surfaces (i.e., the housing 32, outer race 36, and/or shrouds 46). While, the mounting disk 62 may be fixed relative to its sealing surface (i.e., the inner race 34).

In other examples, rather than clamping the external bearing seal 58 to the bearing 30 and the housing 32, the external bearing seal 58 may be crimped to either the inner 34 or outer 36 race. If the external bearing seal 58 is fixed relative to the inner race 34, then the mounting disk 62 may be crimped to the inner race 34, and the external bearing seal 58 will be fixed relative to the inner race 34 and will rotate relative to the outer race 36. The first 64, second 66, and third 68 sealing rings will rotate relative to their sealing surfaces, as described above.

The structure of the external bearing seal 58 may be varied, such that the mounting disk 62 and sealing member 60 are radially inverted relative to one another, such that the mounting disk 62 is radially outward of the sealing member 60, and with the first sealing ring 64 being inward of the second 66 and third 68 sealing rings. The external bearing seal 58 may be attached to the outer race 36, such as by crimping or clamping, and may be fixed relative to the outer race 36 and may rotate relative to the inner race 34. This will provide a similar system to the one described above. In this example, the first sealing lip 64 may seal against the shaft 26. The second sealing lip 66 may seal against the shaft 26, the inner race 34, and/or the interface between the shaft 26 and the inner race 34. The third sealing ring may seal against the inner race 34, the shroud 46, and/or the interface between the inner race 34 and the shroud 46. During rotation of the rollers 24, the external bearing seal 58 may remain rotationally stationary, such that the shaft 26 and the inner race 34 may rotate relative to the first 64, second 66, and/or third 68 sealing rings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A bearing assembly, comprising:
   a bearing having an inner race and an outer race concentrically arranged and spaced apart by one or more bearing members about which the inner and outer races are relatively rotatable about an axis;
   an internal seal arrangement having at least one shroud extending between the inner and outer races and spaced apart along the axis from the one or more bearing members;
   a bearing housing; and
   an external seal arrangement having at least one external seal arranged axially outside of the bearing, the at least one external seal having at least three seal rings, at least two of the three rings in radially spaced relation to one other, wherein a first of the seal rings is in sealing engagement with the outer race, a second of the seal rings is in sealing engagement with the at least one shroud, and a third of the seal rings is in sealing engagement with the bearing housing.

2. The bearing assembly of claim 1, wherein the at least one external seal includes two external seals located on opposite axial sides of the bearing.

3. The bearing assembly of claim 1, wherein at least two of the at least three seal rings are concentrically arranged.

4. The bearing assembly of claim 1, wherein one of the inner and outer races rotates relative to at least one of the at least three seal rings.

5. The bearing assembly of claim 1, wherein the at least one shroud includes two shrouds spaced apart on opposite axial sides of the one or more bearing members;
   wherein the at least one external seal includes two external seals located on opposite axial sides of the bearing, the first and second seal rings of each external seal in radially spaced relation; and
   wherein the first seal rings of the external seals are in sealing engagement with the outer race and the second seal rings of the external seals are in sealing engagement with the shrouds.

6. The bearing assembly of claim 1, wherein the at least one external seal includes:
   an annular support disk; and
   an annular seal body supported by the support disk at one of radially inward and outward of the support disk with respect to the axis, the annual seal body having the at least one seal ring.

7. A bearing assembly, comprising:
   a bearing having an inner race and an outer race concentrically arranged and spaced apart by one or more bearing members about which the inner and outer races are relatively rotatable about an axis; and
   an external seal arrangement having at least one external seal arranged axially outside of the bearing, the external seal having at least one seal ring in sealing engagement with at least one of the inner and outer races of the bearing,
   wherein the at least one external seal includes:
   an annular support disk; and
   an annular seal body supported by the support disk outward of the support disk with respect to the axis, the annual seal body having the at least one seal ring;
   wherein the support disk is within a center of the annular seal body;
   wherein the support disk includes an annular groove and the annual seal body includes a flange mounted within the annular groove of the support disk;
   wherein the annular groove extends in a radial direction and opens to an outer circumference of the support disk; and
   wherein the flange extends radially at an inner circumference of the annular seal body.

8. The bearing assembly of claim 7, wherein the at least one external seal includes two external seals located on opposite axial sides of the bearing, each external seal having at least one seal ring such that the at least one seal ring of each external seal seals against at least one of the inner and outer races.

9. The bearing assembly of claim 7, wherein the at least one seal ring includes at least two seal rings concentrically arranged.

10. The bearing assembly of claim 7, wherein one of the inner and outer races rotates relative to the at least one seal ring.

11. A bearing assembly for coupling to a shaft extending along an axis, the bearing assembly comprising:
    a bearing housing;
    a bearing mounted in the bearing housing and having an inner race and an outer race concentrically arranged and spaced apart by one or more bearing members about which the inner and outer races are relatively rotatable about the axis;
    an internal seal arrangement having at least one shroud extending between the inner and outer races and spaced apart along the axis from the one or more bearing members;
    an external seal arrangement having at least one external seal with at least three seal rings including an outer seal ring in sealing engagement with the bearing housing, a first inner seal ring in sealing engagement with at least one of the bearing housing and outer race and a second inner seal ring in sealing engagement with at least one of the outer race and the shroud; and a locating feature positioning the at least one external seal with respect to the bearing.

12. The bearing assembly of claim 11, further including an internal seal arrangement having two shrouds extending between the inner and outer races and spaced apart along the axis on each axial side of the one or more bearing members; and wherein the at least one external seal includes two external seals located on opposites axial sides of the bearing, each external seal having multiple concentric seal rings.

13. The bearing assembly of claim 11, wherein one of the inner and outer races rotates relative to at least one of the at least three seal rings.

14. The bearing assembly of claim 11, where the locating feature includes at least one of a clamping plate, a shim, and a fastener.

* * * * *